Figure 5:
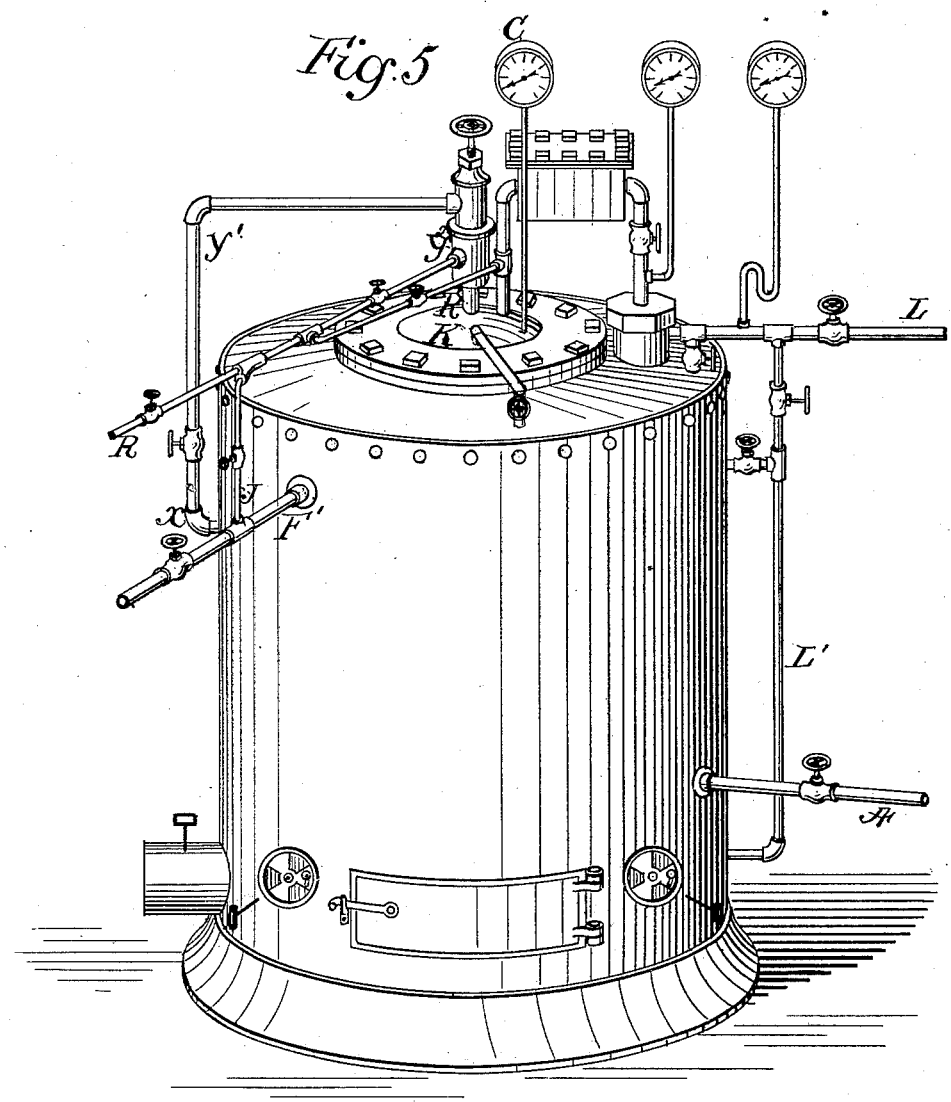

(No Model.) 2 Sheets—Sheet 1.
J. B. ARCHER.
APPARATUS FOR MANUFACTURING ILLUMINATING GAS.
No. 341,624. Patented May 11, 1886.
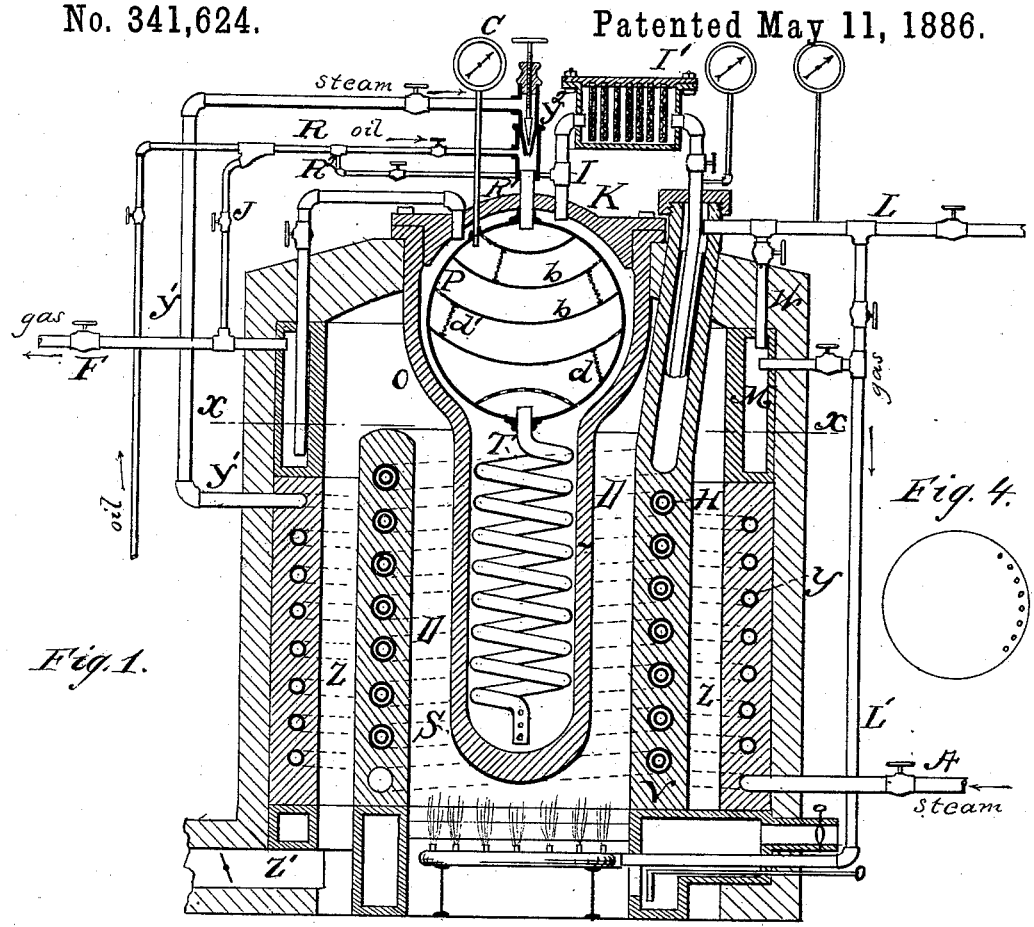
Fig. 1.
Fig. 4.
Fig. 3.
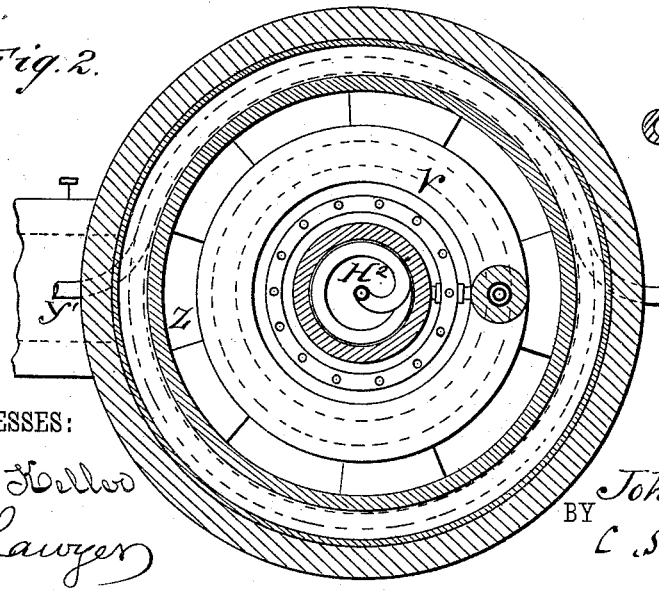
Fig. 2.
WITNESSES:
C. Fred. Hellos
J. B. Lawyer
INVENTOR
John B. Archer.
BY C. S. Whitman.
ATTORNEY (No Model.) 2 Sheets—Sheet 2.

J. B. ARCHER.
APPARATUS FOR MANUFACTURING ILLUMINATING GAS.

No. 341,624. Patented May 11, 1886.

UNITED STATES PATENT OFFICE.

JOHN B. ARCHER, OF WASHINGTON, DISTRICT OF COLUMBIA.

APPARATUS FOR MANUFACTURING ILLUMINATING-GAS.

SPECIFICATION forming part of Letters Patent No. 341,624, dated May 11, 1886.

Application filed August 6, 1885. Renewed April 12, 1886. Serial No. 198,645. (No model.)

*To all whom it may concern:*

Be it known that I, JOHN B. ARCHER, a citizen of the United States, residing at Washington, in the District of Columbia, have invented certain new and useful Improvements in Apparatus for Manufacturing Illuminating-Gas; and I do hereby declare the following to be a full, clear, and exact description of the invention, such as will enable others skilled in the art to which it appertains to make and use the same.

My invention relates to the manufacture of an illuminating gas in which the decomposition of water plays a prominent part, as distinguished from gas produced solely by the decomposition of bituminous coal, oil, or other similar substances, which may be defined to be the gaseous product resulting from the interaction of steam and carbon at a high temperature; or, in other words, the carbon seizes upon the oxygen of the steam and unites with it, at the same time liberating the hydrogen.

According to my present invention the product of the decomposition of liquid hydrocarbons passes to a spiral tubular retort incased in metal, where, together with water-gas resulting from the interaction of steam and carbon, it is subjected to a high temperature and gasified.

My invention also relates to gas-producers and apparatus made use of for generating gas for heating and illuminating purposes from hydrocarbons, by the action thereon of heat and steam; and the nature thereof consists, principally, in the means used for the production of the vapor and transforming it into a fixed gas, which may be used for illuminating or heating.

It also consists in certain novel features in the construction of the apparatus, which will be hereinafter fully described.

In the accompanying drawings, in which corresponding parts are designated by similar letters, Figure 1 is a vertical central section of the apparatus. Fig. 2 is a horizontal section taken on the line $x\,x$, Fig. 1. Fig. 3 illustrates in detail the ends of the pipe in which the vapor from the generator is adheated and transformed or converted into a permanent gas. Fig. 4 is a detail view, and Fig. 5 a perspective view, of the apparatus.

The chamber in which the volitilization of the liquid hydrocarbons takes place, consists of an outer casing, O, in which is placed a spherical shell, P, located in such a manner as to form a steam-space between the latter and the former.

The steam enters the apparatus by the pipe A at a temperature of about 375° Fahrenheit, and then passes spirally upward through the coiled superheating-pipe Y to the exterior pipe, Y', which it enters after being superheated, at a temperature of about 1,000° Fahrenheit. At the point $Y^2$ an injector is placed within the pipe for the purpose of forming a vacuum below the entrance of the oil-pipe R, and thus forcing the oil downward and thoroughly intermixing it with the steam. The mixed oil and steam enters, by the pipe R', the spherical shell P, which is provided with a number of partition-plates, $b$, each of which has the form of the surface of a spherical segment. A series of holes are formed near the alternate edges of these circular segments, as is best shown in Fig. 4, through which the mixed steam and hydrocarbon vapors flow downward. A number of cross-partitions, $d'$, provided with apertures may be arranged between the circular partitions $b$, in order to effect a more complete intermixture between the steam and hydrocarbon vapor.

The pipe R' enters the apparatus through a hole cut in the cap K of the casing, which is extended downward through the central vertical passage, D, in such a manner as to form an annular flue for the escape of the products of combustion around its exterior surfaces and between itself and the inner spherical surface of the cylinder V.

Within the casing O is arranged the spherical shell P, having a tube, T, which extends downward within the dependent part S in such a way as to form about itself an upward passage for the hydrocarbon vapor and steam. This tube is coiled within the part S, so that the mixed vapors will be made to travel over a circuitous course and become intensely heated.

The upper part of the casing O is fitted to a cap-piece, K, which is provided with holes for the reception of the steam and oil induction-pipes, and the vapor-eduction pipes, and also for a pipe leading to the pyrometer C, by which construction the casing is rendered imperforate at all points where it is subjected to the direct action of the products of combustion, and all holes drilled for the reception of pipes are in the cap-piece, which is in contact with the outer air.

An annular projection is formed upon the upper edge of the casing O, by means of which the latter is supported by the crown of the apparatus in such a manner that it can be removed with facility for repairs or other purposes.

The gas-eduction pipe I is led to a second mixing-chamber, I', and thence downward, where it is coiled spirally and incased by an iron or steel annular casing cast or formed about it. On the exterior of this vapor-eduction pipe is coiled a symmetrical pipe, H, in such a manner as to form an annular spiral passage between the two pipes.

The vapor generated as hereinbefore described by the action of heat and steam upon the oil in the receiver P passes downward through the coiled pipe $H^2$, thence upward about the pipe $H^2$ and receiver P, thence through the inner pipe, H', to a point near the bottom of the closed end of the outer pipe, H, as shown best in Fig. 3, and thence upward through the annular spiral space between the inner tube, H', and outer tube, H, to the cylindrical retort M, the inner peripheral surface of which is exposed to the direct heat of the escaping products of combustion, or the gas may be drawn off by the pipe L without passing into the retort.

It will be noted that the vapor after leaving the vaporizing-chamber is subjected to intensely-heated surfaces, equal in area to the aggregate of the outer peripheral surfaces of the inner pipe and the inner peripheral surface of the outer pipe, and that it is made to travel over a distance about equal to the sum of the lengths of the two pipes. This travel of the mingled vapors in a thin stream over highly-heated surfaces has the effect of producing therefrom a permanent gas which may be used for illuminating and other purposes.

The gas generated passes by the pipe L and branch pipe N to the retort M, and from thence by the pipe F to the point where it is required. A branch pipe J leads from the pipe F to the oil-induction pipe R, so that in some instances the inflowing oil may be heated by the addition of a small portion of intensely-heated gas.

The furnace or burner B is supplied with gas by the branch pipe L', and the flame and products of combustion therefrom first pass upward through the central flue, D, and thence downward through the diving-flue Z to the chimney Z'. A branch pipe, $R^2$, leads from the main oil-induction pipe R to the gas-eduction pipe I, and both of these pipes are provided with stop-cocks or valves, by means of which the oil flowing through them may be accurately regulated.

The apparatus above described may be used in carrying out a process for the manufacture of a fixed illuminating-gas, the steps of which are as follows: First, the steam is heated to a temperature of about 1,000° Fahrenheit; second, about one-half to two-thirds of the oil to be transformed into gas is mixed and vaporized with the superheated steam; third, the vapor and steam are thoroughly intermixed and raised to a temperature of about 1,300° Fahrenheit; fourth, the remaining one-third of the oil is intermixed with the vapor; and, fifth, the vapor thus enriched is raised to a temperature of nearly 2,000° Fahrenheit in a pipe or pipes, the exterior surfaces of which are protected from the direct action of the flame.

Having thus described my invention, I claim and desire to secure by Letters Patent—

1. In a gas-making apparatus, a heater consisting of two coils of pipes, the one within the other, and an annular jacket or body of iron or steel cast directly around the outer coil, as and for the purpose described.

2. The combination of the furnace, the two coils of pipe, the one within the other, the cylindrical casing of iron or steel surrounding the outer pipe, and an annular casing or furnace-wall of refractory material, as and for the purpose described.

3. In a gas-making apparatus, a vapor-heater consisting of two coils of pipe, the one within the other, the open end of the inner pipe terminating at a short distance from the closed end of the outer pipe, as and for the purpose described.

4. In a gas-making apparatus, a vapor-generating chamber, and a heater consisting of two coils of pipe, the one within the other, the open end of the inner pipe terminating at a short distance from the closed end of the outer pipe, combined together as and for the purpose described.

5. The combination of the casing O, having a dependent part, S, the spherical shell P, and the coil T, coiled within the dependent part, as and for the purpose described.

6. The combination of the casing O, having a dependent part, S, the spherical shell P, provided with diaphragms $b$, the oil-induction and vapor-eduction pipe, and the pipe T, coiled within the dependent part, as and for the purpose described.

7. In a gas-making apparatus, a vaporizing-chamber, a vapor-heater consisting of two coils of pipe, the one within the other, in combination with a retort communicating with the outer pipe, as and for the purpose described.

8. The combination of the furnace, the two coils of pipe, the one within the other, the cylindrical casing of iron or steel surrounding the outer pipe, and a furnace-wall in which is placed an annular retort.

9. In a gas-making apparatus, the combination of the vaporizing-retort, the oil-induction pipe, the vapor-eduction pipe, and branch pipe leading from the oil-induction pipe to the vapor-eduction pipe, as and for the purpose described.

10. The combination of the furnace, the two coils of pipe, the one within the other, the cylindrical casing of iron or steel surrounding the outer pipe, and a furnace-wall inclosing the steam-superheating pipe, as and for the purpose described.

JOHN B. ARCHER.

Witnesses:
W. F. RICHIE,
THEO. M. NEVINS.